(12) United States Patent
Parnin et al.

(10) Patent No.: US 10,513,949 B2
(45) Date of Patent: Dec. 24, 2019

(54) AUXILIARY JOURNAL OIL SUPPLY SYSTEM

(71) Applicant: United Technologies Corporation, Farmington, CT (US)

(72) Inventors: Francis Parnin, Suffield, CT (US); Justin W. Heiss, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 624 days.

(21) Appl. No.: 15/260,995

(22) Filed: Sep. 9, 2016

(65) Prior Publication Data

US 2018/0073395 A1 Mar. 15, 2018

(51) Int. Cl.
*F01D 25/20* (2006.01)
*F01D 15/12* (2006.01)
*F16H 57/04* (2010.01)

(52) U.S. Cl.
CPC ............. *F01D 25/20* (2013.01); *F01D 15/12* (2013.01); *F16H 57/0404* (2013.01); *F16H 57/0441* (2013.01); *F16H 57/0442* (2013.01); *F05D 2220/32* (2013.01); *F05D 2260/98* (2013.01)

(58) Field of Classification Search
CPC .......... F01D 25/20; F01D 25/18; F01D 15/12; F01M 11/067; F01M 2001/123; F02C 7/06; F02C 7/36; F02K 3/06; F16H 57/0404; F16H 57/0441; F16H 57/0442; F16H 57/042; F16H 57/045; F16H 57/0479; F05D 2220/32; F05D 2260/98; F05D 2260/40311
See application file for complete search history.

(56) References Cited

U.S. PATENT DOCUMENTS

| 3,618,710 | A  | * | 11/1971 | DeLisse | F01D 25/20 |
| | | | | | 184/6.11 |
| 8,230,974 | B2 | | 7/2012 | Parnin | |
| 8,267,826 | B2 | | 9/2012 | Duong et al. | |
| 8,307,626 | B2 | * | 11/2012 | Sheridan | F01D 25/20 |
| | | | | | 184/26 |
| 8,459,413 | B2 | * | 6/2013 | Gmirya | B64C 27/12 |
| | | | | | 184/6.22 |

(Continued)

FOREIGN PATENT DOCUMENTS

EP 2224120 9/2010
WO 2014133836 9/2014

(Continued)

OTHER PUBLICATIONS

EP Search report dated Mar. 8, 2018 in EP Application No. 17185574.5.

*Primary Examiner* — Justin D Seabe
*Assistant Examiner* — Joshua R Beebe
(74) *Attorney, Agent, or Firm* — Snell & Wilmer, L.L.P.

(57) ABSTRACT

A fluid circulation system may comprise a main pump configured to provide oil to a journal bearing. An auxiliary system including a pump system may be configured to provide oil to the journal bearing. A manifold may be configured to mix the oil from the main pump with oil from the auxiliary system. A journal delivery line may be configured to deliver the oil from the manifold to the journal bearing.

20 Claims, 5 Drawing Sheets

(56) References Cited

U.S. PATENT DOCUMENTS

| | | | |
|---|---|---|---|
| 8,484,942 B1 * | 7/2013 | McCune | ................ F01D 25/18 |
| | | | 184/6.12 |
| 8,491,436 B2 | 7/2013 | Duong et al. | |
| 8,968,141 B2 | 3/2015 | Duong et al. | |
| 8,978,829 B2 | 3/2015 | McCune et al. | |
| 2014/0000721 A1 | 1/2014 | McCune | |

FOREIGN PATENT DOCUMENTS

| | | | | |
|---|---|---|---|---|
| WO | 2014152347 | 9/2014 | | |
| WO | WO-2014133836 A1 * | 9/2014 | ............. | F01D 25/20 |
| WO | 2015076903 | 5/2015 | | |
| WO | WO-2015126500 A1 * | 8/2015 | ............. | F01D 25/20 |

* cited by examiner

AUXILIARY JOURNAL OIL SUPPLY SYSTEM

FIELD

The present disclosure relates to a lubrication system for gas turbine engines, and, more specifically, to a fluid circulation system for a fan drive gear system in gas turbine engines.

BACKGROUND

Gas turbine engines typically include a fan section, a compressor section, a combustor section and a turbine section. In many gas turbine engines, a low pressure spool includes a low pressure turbine connected to and driving a low pressure compressor, and a high pressure spool includes a high pressure turbine connected to and driving a high pressure compressor. In various gas turbine engines, a fan at the front of the engine is connected to the low pressure spool through a fan drive gear system. Geared turbofan engines may use journal bearings and rotating gears in the gear systems. Journal bearings operate using a film of oil. Gears also rely on lubrication to limit wear. A main pump is typically driven by the high pressure spool, connected through gearing, and is used to pump lubricating and cooling fluid to all engine components that require lubrication and cooling. When the high pressure spool stops rotating or rotates at a reduced rpm (revolutions per minute), the fan drive gear system can continue rotating even though the main pump will ordinarily provide little or no fluid during this time. For example, wind may rotate the fan and corresponding gears and bearings while the aircraft is parked on the ground or during an in-flight engine shutdown. Certain gears and bearings can also be damaged by a relatively short period of non-lubricated operation during windmilling.

SUMMARY

A fluid circulation system configured to supply fluid to journal bearings of a fan drive gear system is described herein, in accordance with various embodiments. A fluid circulation system may comprise a main pump configured to provide oil to a journal bearing. An auxiliary system including a pump system may be configured to provide oil to the journal bearing. A manifold may be configured to mix the oil from the main pump with oil from the auxiliary system. A journal delivery line may be configured to deliver the oil from the manifold to the journal bearing.

In various embodiments, the fluid circulation system may further comprise a main journal supply line coupled between the main pump and the manifold. An auxiliary journal supply line may be coupled between the auxiliary system and the manifold. The journal delivery line may be coupled to the main journal supply line and the auxiliary journal supply line. A check valve may be disposed on the main journal supply line between the main pump and the auxiliary journal supply line. A filter may be disposed on the auxiliary journal supply line between the auxiliary system and the manifold. An auxiliary oil pressure sensor may be disposed on the auxiliary journal supply line between the pump system and the manifold. The pump system of the auxiliary system may include a first pump configured to retrieve oil from a gutter of a fan drive gear system. A second pump may be configured to retrieve oil from a bearing compartment. The auxiliary system may be configured to pump oil in response to rotation by a fan.

A gas turbine engine is also provided. The gas turbine engine may comprise a fan drive gear system. A fan may be mechanically coupled to the fan drive gear system and configured to rotate about an axis. The fan drive gear system may include a journal bearing. A main pump may be configured to provide oil to a manifold. An auxiliary system may be configured to provide oil to the manifold. The manifold may be configured to supply the journal bearing with oil from the main pump and the auxiliary system.

In various embodiments, the auxiliary system may include a first pump configured to retrieve oil from a gutter of a fan drive gear system, and a second pump configured to retrieve oil from a bearing compartment. The auxiliary system may be configured to pump oil to the manifold in response to rotation by the fan. A main journal supply line may be coupled between the main pump and a manifold. An auxiliary journal supply line may be coupled between the auxiliary system and the manifold. The manifold may be configured to mix the oil from the main pump with oil from the auxiliary system. A journal delivery line may be coupled to the main journal supply line and the auxiliary journal supply line. A filter may be disposed on the auxiliary journal supply line between the auxiliary system and the manifold. A check valve may be disposed on the main journal supply line between the main pump and the auxiliary journal supply line. The pump system may be housed within a bearing compartment.

A method of supplying fluid to journal bearings of a fan drive gear system may comprise collecting oil from a bearing compartment into a compartment sump, collecting oil from a gutter of the fan drive gear system into an auxiliary reservoir, pumping oil from at least one of the auxiliary reservoir or the compartment sump to a manifold, pumping oil from a main reservoir to the manifold, and delivering the oil from the manifold to a journal bearing in response to rotation by a fan.

In various embodiments, the step of pumping oil from at least one of the auxiliary reservoir or the compartment sump to a manifold may be in response to rotation by a fan. The method may further comprise mixing in the manifold the oil from the main reservoir and the oil from at least one of the auxiliary reservoir or the compartment sump. The method may further comprise pumping oil from the auxiliary reservoir by a first pump of a pump system, pumping oil from the compartment sump by a second pump of the pump system. The pump system may be housed within the bearing compartment. The method may further comprise filtering the oil from at least one of the auxiliary reservoir or the compartment sump prior to delivering the oil to the manifold.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Gas turbine engines may use oil for cooling and lubrication. Engines having a fan section driven by separate gearing may further use oil to cool and lubricate the fan gearing. Various embodiments are directed to systems and methods for delivering oil to journal bearings in a fan drive gear system of a gas turbine engine. The systems and methods according to various embodiments continuously supply oil from an auxiliary supply to the journal bearings during engine operating conditions and during non-operating conditions, such as during windmilling. During engine operating conditions, the fluid circulating system delivers oil from a main oil supply and from an auxiliary oil supply to journal bearings of a fan drive gear system. During engine non-operating conditions, the fluid circulating system delivers oil from auxiliary oil supply to the journal bearings.

Figure 1:
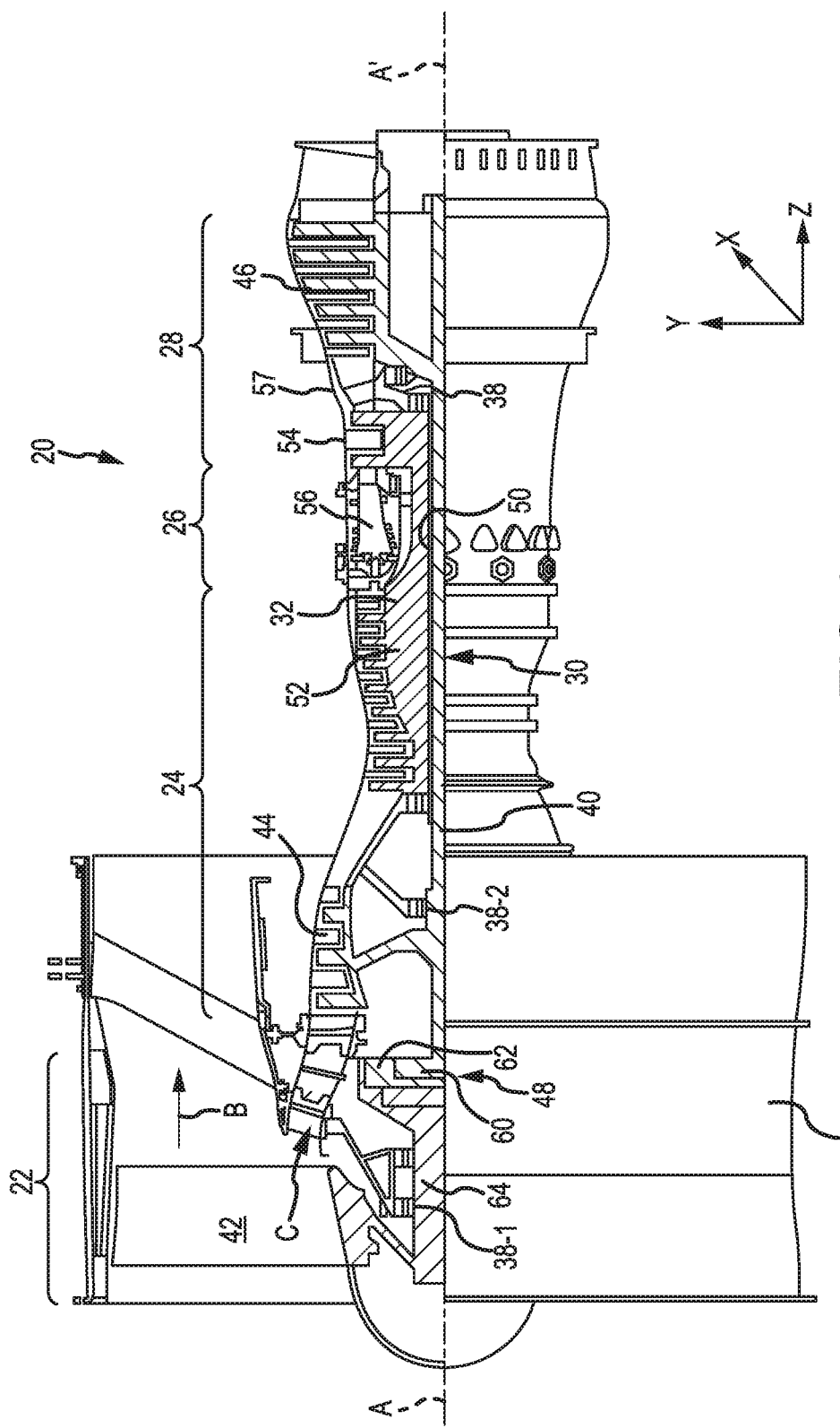
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a fan shaft 64, which is coupled to fan 42. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). It should be understood, however, that the above parameters are exemplary of various embodiments of a suitable geared architecture engine and that the present disclosure contemplates other turbine engines.

Figure 2:
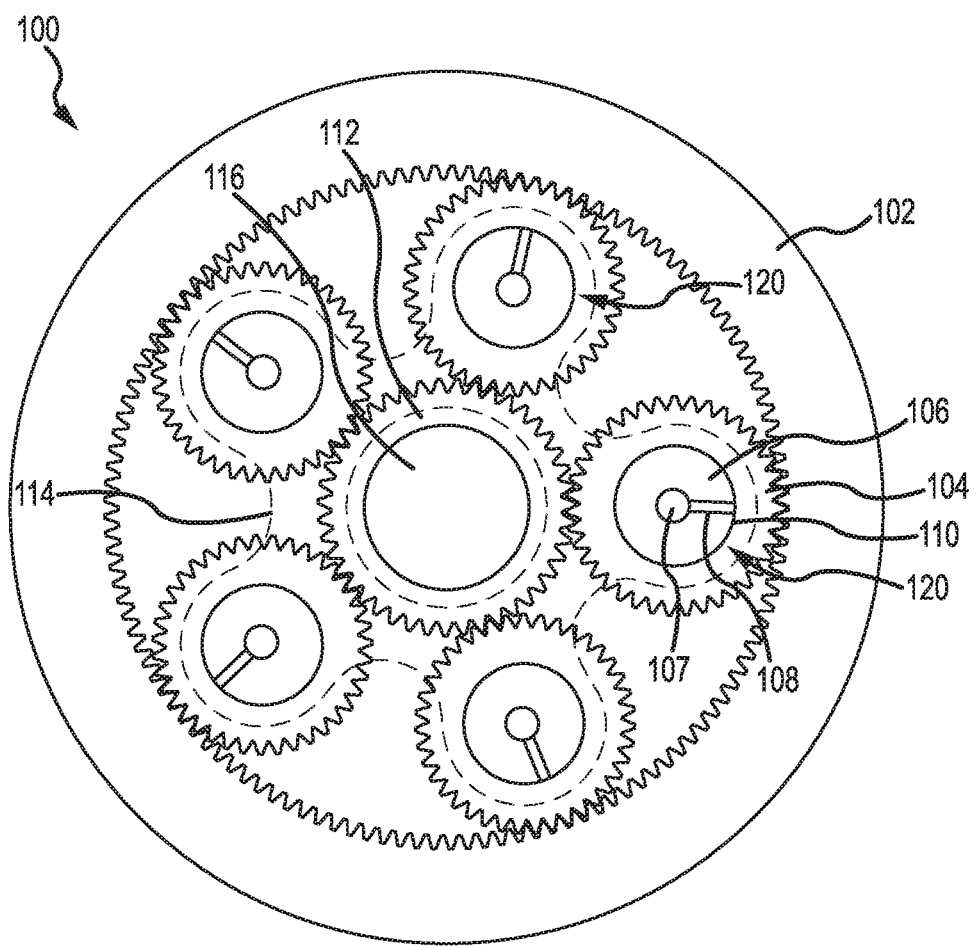
FIG. 2 illustrates an exemplary fan drive gear system, in accordance with various embodiments.

With reference now to FIG. 2 and still to FIG. 1, geared architecture 48 may include a fan drive gear system 100 which couples fan shaft 64 to inner shaft 40 and low speed spool 30. During engine operating conditions, low speed spool 30 and fan drive gear system 100 causes fan shaft 64 to rotate at a slower rotational velocity than that of low speed spool 30. Fan drive gear system 100 allows fan 42 and low speed spool 30 to rotate at different speeds for improved operation of both of fan 42 and low speed spool 30. When the gas turbine engine 20 is in non-operating conditions, ambient wind blowing through gas turbine engine 20 may rotate fan 42. Air flow through fan 42 can cause rotation of fan 42 and thereby driving geared architecture 48. It is preferable to provide lubricant flow to the geared architecture 48 in all instances where it is rotating.

In various embodiments and with reference to FIG. 2, fan drive gear system 100 may comprise an epicyclic gear system. The fan drive gear system 100 may comprise an annular gear 102 with gear teeth facing radially inward to interface with a plurality of star gears 104. Star gears 104 may be disposed radially inward from annular gear 102 and may comprise gear teeth around an outer diameter of star gears 104. Each of star gears 104 may comprise a journal pin 106 central to the star gear 104. In that regard, star gear 104 may be a journal housing that forms a journal bearing 120 for star gear 104 rotating relative to journal pin 106. Oil may be delivered to each journal bearing 120 through an internal bore 107 of journal pin 106. The oil may pass through passage 108 to form an oil film 110 between journal pin 106 and star gear 104, generally following the circumference of journal pin 106. Star gear 104 may rotate about journal pin 106 with oil film 110 filling a space between journal pin 106 and star gear 104 to provide lubrication to journal bearing 120. A sun gear 112 may be central to fan drive gear system 100. Sun gear 112 may be fixed to shaft 116 extending axially from the center of annular gear 102 and the center of sun gear 112.

In various embodiments, star gears 104 may be coupled to carrier 114. Carrier 114 is illustrated with dashed lines in FIG. 2 to provide greater detail of features behind carrier 114. Journal pin 106 may be fixed in place relative to a reference point outside the epicyclic gear system (such as an engine) by carrier 114, and both sun gear 112 and annular gear 102 may rotate. In that regard, shaft 116 and annular gear 102 may provide an input and output to fan drive gear system 100. In various embodiments, star gears 104 may also move about sun gear 112 (star gear 104 may be referred to as a planet gear in this configuration) and either annular gear 102 or sun gear 112 may be fixed in place. In that regard, carrier 114 and the unfixed gear of sun gear 112 and annular gear 102 may provide an input and output to fan drive gear system 100.

Figure 3A:
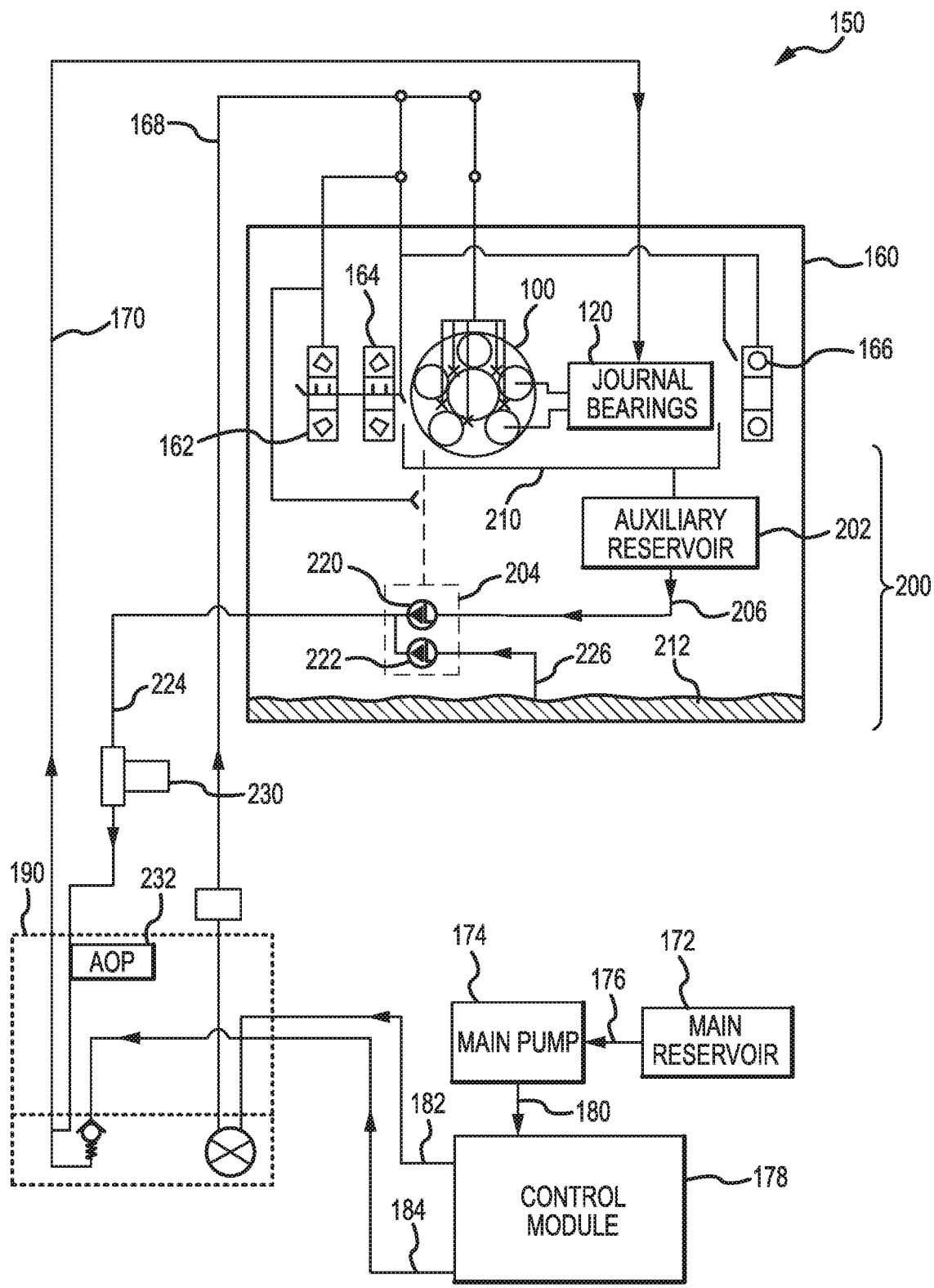
FIG. 3A illustrates a partial schematic view of a fluid delivery system, in accordance with various embodiments.

In various embodiments and with reference to FIG. 3A, a fluid circulation system 150 may supply a lubricating fluid to fan drive gear system 100 and journal bearings 120 as well as support bearings 162, 164, 166. A bearing compartment 160 may contain fan drive gear system 100, journal bearings 120 and support bearings 162, 164, 166. Fluid circulation system 150 may supply oil to fan drive gear system 100 and support bearings 162, 164, 166 through a delivery line 168. Fluid circulation system 150 may supply oil to journal bearings 120 through a journal delivery line 170. Fluid circulation system 150 may include a main reservoir 172 fluidly coupled to a main pump 174 through a supply line 176. Main reservoir 172 holds a lubricating fluid, such as oil. Main pump 174 may pump oil from main reservoir 172 to a control module 178. Main pump 174 may be fluidly coupled to control module 178 by a supply line 180. Control module 178 may receive oil through supply line 180 from main pump 174 and/or main reservoir 172 and may direct the oil through a main journal supply line 184 and a main supply line 182 to a manifold 190. Manifold 190 may include a plurality of passages and valves for distributing oil to fan drive gear system 100, journal bearings 120 and support bearings 162, 164, 166.

Fluid circulation system 150 may further include an auxiliary system 200 configured to deliver a continuous oil supply to journal bearings 120, for example, during rotation of fan 42 or low speed spool 30 (see FIG. 1). Auxiliary system 200 may comprise an auxiliary reservoir 202 fluidly coupled to a pump system 204 by a line 206. A portion of the oil from fan drive gear system 100 and journal bearings 120 may supply auxiliary reservoir 202 with oil. As fan drive gear system 100 spins, oil drips or is propelled off fan drive gear system 100 into bearing compartment 160. A portion of that oil is caught and collected by an oil channel or gutter 210 and funneled to auxiliary reservoir 202. Gutter 210 may not collect all fluid leaving fan drive gear system 100. The remaining oil that is not collected by gutter 210 falls to a compartment sump 212, which may be a reservoir at a bottom of bearing compartment 160. Pump system 204 may pump oil from auxiliary reservoir 202 and oil from compartment sump 212. Pump system 204 of auxiliary system 200 may be housed within bearing compartment 160.

Pump system 204 may comprise a plurality of pumps and may include a first pump 220, which may pump oil from auxiliary reservoir 202, and a second pump 222, which pump oil from compartment sump 212. First pump 220 may be configured to retrieve oil from gutter 210 of fan drive gear system 100. Second pump 222 may be configured to retrieve oil from compartment sump 212 of bearing compartment 160. First pump 220 and second pump 222 may be separate gear pumps driven by the same rotating shaft, such as fan shaft 64 from FIG. 1. The engine may drive fan shaft 64, which may drive first pump 220 and second pump 222 of pump system 204 as well as fan drive gear system 100. When the engine is in a non-operating windmill condition, the fan 42 may drive the fan shaft 64 and thereby drive the fan drive gear system 100 and pump system 204. Thus, pump system 204 pumps oil from auxiliary system 200 to journal bearings 120 when fan shaft 64 is rotating, without regard to whether the rotation of fan shaft 64 is due to engine operation or due to windmilling. Pump system 204 may be driven by low speed spool 30 or fan shaft 64 or may be electrically powered. Pump system 204 may be configured to pump oil from auxiliary system 200 to journal bearings 120 during engine operating conditions and during non-operating conditions.

Oil pumped from auxiliary system 200 by pump system 204 may be delivered to manifold 190 through an auxiliary journal supply line 224. Pump system 204 may pressurize the oil from auxiliary reservoir 202 and compartment sump 212. First pump 220 of pump system 204 may be fluidly coupled with auxiliary reservoir 202 by line 206 and may pump fluid from auxiliary reservoir 202 to manifold 190 by way of auxiliary journal supply line 224. Second pump 222 of pump system 204 may be fluidly coupled with compartment sump 212 by line 226 and may pump fluid from compartment sump 212 to manifold 190 by way of auxiliary journal supply line 224. The oil pumped from compartment sump 212 by second pump 222 may be mixed with the oil pumped from auxiliary reservoir 202 by first pump 220. The mixed oil may be supplied to manifold 190 through auxiliary journal supply line 224.

Manifold 190 may deliver oil to journal bearings 120 through journal delivery line 170. During engine operation, manifold 190 may receive oil from control module 178 through main journal supply line 184 and may receive oil from auxiliary system 200 through auxiliary journal supply line 224. The main journal supply line 184 and auxiliary journal supply line 224 may be fluidly coupled within manifold 190, thereby mixing the oil from main journal supply line 184 ("main oil") and the oil from auxiliary journal supply line 224 ("auxiliary oil"). Journal delivery line 170 delivers the mix of auxiliary oil and main oil to journal bearings 120.

During windmilling, main pump 174 may not operate to provide main journal supply line 184 with oil at a sufficient pressure to supply oil to journal bearings 120. Auxiliary system 200 may be independent from the operation of main pump 174 and the oil pressure in main journal supply line 184. In various embodiments, pump system 204 may operate during windmilling by the rotation of the fan or low speed spool driving first pump 220 and second pump 222 to pump auxiliary oil to journal bearings 120. Pump system 204 may be electrically powered and configured to pump auxiliary oil to journal bearings 120 when main pump 174 is operating and when main pump 174 is not operating. When main pump 174 is not operating, journal delivery line 170 delivers auxiliary oil from auxiliary journal supply line 224 to journal bearings 120. Thus, auxiliary system 200 pumps auxiliary oil to journal bearings 120, for example in response to rotation by fan 42, during both engine operation and during windmilling and provides a continuous auxiliary oil supply to journal bearings 120.

Auxiliary journal supply line 224 may include a filter 230 for filtering the auxiliary journal supply fluid and may include an auxiliary oil pressure (AOP) sensor 232 for sensing the pressure of the auxiliary journal supply fluid within auxiliary journal supply line 224. Filter 230 may be disposed on the auxiliary journal supply line 224 between auxiliary system 200 and manifold 190. AOP sensor 232 may be disposed on the auxiliary journal supply line 224 between pump system 204 and manifold 190. A pressure of the oil in auxiliary journal supply line 224 may indicate a status of the filter 230. If oil pressure in auxiliary journal supply line 224 falls below a threshold, AOP sensor 232 may indicate maintenance for filter 230.

Figure 3B:
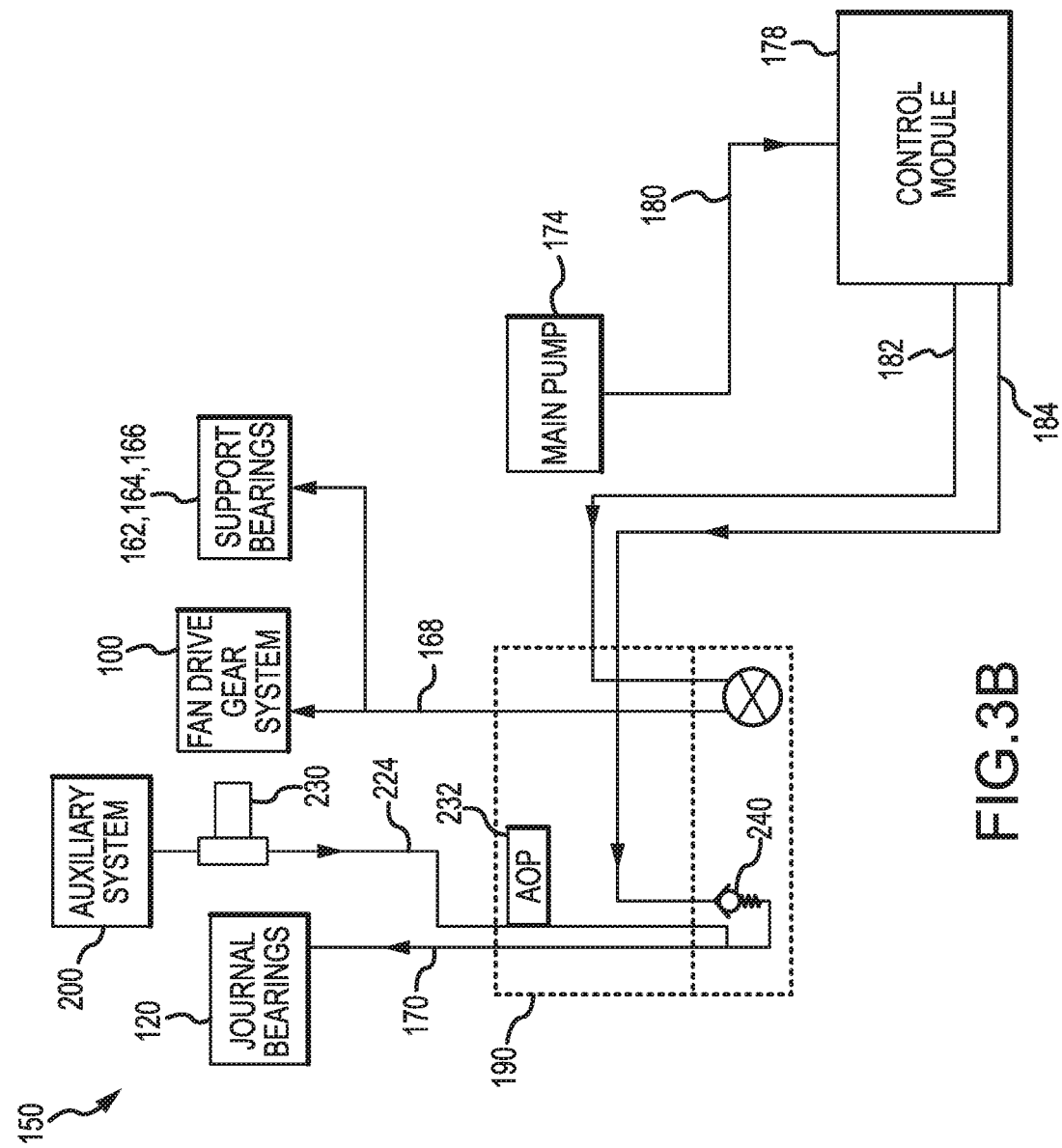
FIG. 3B illustrates a partial schematic view of a fluid delivery system, in accordance with various embodiments.

With reference to FIG. 3B, a partial schematic view of fluid circulation system 150 is shown in accordance with various embodiments. Main pump 174 may be configured to provide oil to journal bearings 120 through manifold 190. Oil from a main oil supply may be pumped by main pump 174 through control module 178 and main journal supply line 184 to manifold 190 and through journal delivery line 170 to journal bearings 120. Auxiliary system 200 may include a pump system 204 (from FIG. 3A) and may be configured to provide oil to journal bearings 120 through manifold 190. Manifold 190 may be configured to mix the oil pumped from by main pump 174 with oil from the auxiliary system 200 pumped by pump system 204. Main journal supply line 184 may be fluidly coupled between main pump 174 and manifold 190. Auxiliary journal supply line 224 may be fluidly coupled between auxiliary system 200 and manifold 190. Journal delivery line 170 may be coupled to main journal supply line 184 line and auxiliary journal supply line 224.

Journal delivery line 170 may be configured to deliver the oil from the manifold 190 to journal bearings 120, wherein the oil delivered to journal bearings 120 may be oil from auxiliary journal supply line 224, oil from main journal supply line 184, or may be a mix of oil from auxiliary journal supply line 224 and main journal supply line 184. During engine operation, fluid circulation system 150 may supply oil from both auxiliary system 200 and main pump 174.

Fluid circulation system 150 may include a check valve 240 disposed on main journal supply line 184 between main pump 174 and auxiliary journal supply line 224. Check valve 240 functions to allow oil flow moving in a first direction from a valve inlet to a valve outlet, while blocking (or substantially blocking) oil flow moving in a second direction from the valve outlet to the valve inlet, for example, where the first direction and the second direction may be 180 degrees opposed to one another. Stated another way, check valve 240 tends to prevent the reversal of the direction of fluid flow. Check valve 240 may reduce oil from journal delivery line 170 and/or auxiliary journal supply line 224 from flowing into main journal supply line 184.

Fluid circulation system 150 may further include main supply line 182 for delivering oil to fan drive gear system 100 and support bearings 162, 164, 166 through manifold 190 and delivery line 168. The supply and delivery lines for journal bearings 120 may not be directly coupled to the supply and delivery lines for fan drive gear system 100 and support bearings 162, 164, 166. Auxiliary journal supply line 224, main journal supply line 184 and journal delivery line 170 may have fewer leak paths, and thus, a more reliable oil supply to journal bearings 120.

Figure 4:
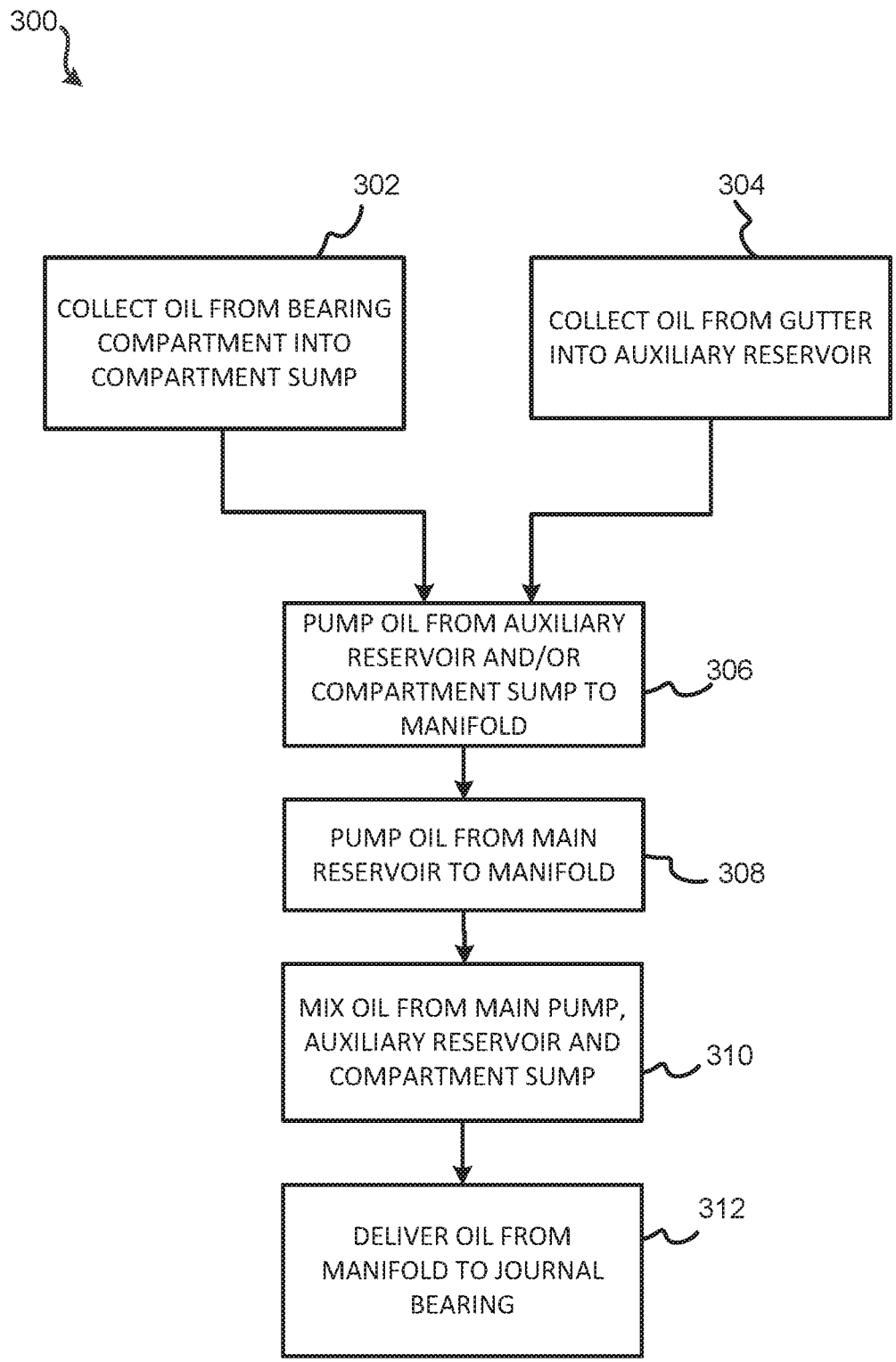
FIG. 4 illustrates a method supplying fluid to journal bearings of a fan drive gear system, in accordance with various embodiments.

With reference to FIG. 4, a method 300 of supplying fluid to journal bearings of a fan drive gear system is shown in accordance with various embodiments. Method 300 may comprise the steps of collecting oil from a bearing compartment into a compartment sump (step 302), collecting oil from a gutter into an auxiliary reservoir (step 304), pumping oil from the auxiliary reservoir and/or the compartment sump to a manifold (step 306), pumping oil from a main reservoir to the manifold (step 308), mixing the oil from the main pump, the auxiliary reservoir, and the compartment sump (step 310), and delivering the oil from the manifold to a journal bearing (step 312).

Step 304 may further include collecting oil from a gutter of a fan drive gear system into the auxiliary reservoir. Step 306 may further include pumping oil from at least one of the auxiliary reservoir or the compartment sump to a manifold. Pumping the oil from the auxiliary reservoir and/or the compartment sump to a manifold may be in response to rotation by a fan. Step 306 may further include pumping oil from the auxiliary reservoir by a first pump of a pump system. Step 306 may further include pumping oil from the compartment sump by a second pump of a pump system. The pump system may be housed within the bearing compartment. Method 300 may further include filtering the oil from the compartment sump and/or the auxiliary reservoir prior to delivering the oil to the manifold.

Step 310 may further include mixing, in the manifold, the oil from the main pump and the oil from at least one of the auxiliary reservoir or the compartment sump. Step 312 may further include delivering the oil from the manifold to a journal bearing in response to rotation by a fan during engine operation. Method 300 may include continuously delivering oil from auxiliary reservoir and a compartment sump to journal bearings 120 when a fan is rotating during engine operation or during windmilling. Method 300 may include delivering oil from the main reservoir during engine operation.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid circulation system, comprising:
    a main pump configured to provide oil to a journal bearing;
    an auxiliary system including a pump system configured to provide oil to the journal bearing continuously through an auxiliary journal supply line;
    a manifold configured to mix the oil from the main pump with oil from the auxiliary system; and
    a journal delivery line configured to deliver the oil from the manifold to the journal bearing, wherein the auxiliary journal supply line is fluidly coupled uninterruptedly and directly to the manifold.

2. The fluid circulation system of claim 1, further comprising:
    a main journal supply line coupled between the main pump and the manifold.

3. The fluid circulation system of claim 2, further comprising a check valve disposed on the main journal supply line between the main pump and the auxiliary journal supply line.

4. The fluid circulation system of claim 2, further comprising a filter disposed on the auxiliary journal supply line between the auxiliary system and the manifold.

5. The fluid circulation system of claim 2, further comprising an auxiliary oil pressure sensor disposed on the auxiliary journal supply line between the pump system and the manifold.

6. The fluid circulation system of claim 1, wherein the pump system of the auxiliary system includes:
    a first pump configured to retrieve oil from a gutter of a fan drive gear system, and
    a second pump configured to retrieve oil from a bearing compartment.

7. The fluid circulation system of claim 1, wherein the auxiliary system is configured to pump oil in response to rotation by a fan.

8. A gas turbine engine, comprising:
    a fan drive gear system;
    a fan mechanically coupled to the fan drive gear system and configured to rotate about an axis, the fan drive gear system including a journal bearing;
    a main pump configured to provide oil to a manifold; and
    an auxiliary system comprising an auxiliary journal supply line, the auxiliary journal supply line fluidly coupled uninterruptedly and directly to the manifold, the auxiliary journal supply line configured to continuously provide oil to the manifold, wherein the manifold is configured to supply the journal bearing with oil from the main pump and the auxiliary system.

9. The gas turbine engine of claim 8, wherein the auxiliary system includes:
    a first pump configured to retrieve oil from a gutter of the fan drive gear system; and
    a second pump configured to retrieve oil from a bearing compartment.

10. The gas turbine engine of claim 8, wherein the auxiliary system is configured to pump oil to the manifold in response to rotation by the fan.

11. The gas turbine engine of claim 8, further comprising:
    a main journal supply line couple between the main pump and the manifold;
    and
    a journal delivery line coupled to the main journal supply line and the auxiliary journal supply line.

12. The gas turbine engine of claim 11, further comprising a filter disposed on the auxiliary journal supply line between the auxiliary system and the manifold.

13. The gas turbine engine of claim 11, further comprising a check valve disposed on the main journal supply line between the main pump and the auxiliary journal supply line.

14. The gas turbine engine of claim 9, wherein the first pump and the second pump of the auxiliary system are housed within a bearing compartment.

15. A method of supplying fluid to journal bearings of a fan drive gear system, comprising:

collecting oil from a bearing compartment into a compartment sump;

collecting oil from a gutter of the fan drive gear system into an auxiliary reservoir;

pumping oil from at least one of the auxiliary reservoir or the compartment sump to a manifold through an auxiliary journal supply line fluidly coupled uninterruptedly and directly to the manifold, wherein the auxiliary journal supply line is configured to deliver oil continuously to the manifold;

pumping oil from a main reservoir to the manifold; and delivering the oil from the manifold to a journal bearing.

16. The method of claim 15, wherein the pumping oil from at least one of the auxiliary reservoir or the compartment sump to a manifold is in response to rotation by a fan.

17. The method of claim 16, further comprising mixing in the manifold the oil from the main reservoir and the oil from at least one of the auxiliary reservoir or the compartment sump.

18. The method of claim 15, further comprising:
pumping oil from the auxiliary reservoir by a first pump of a pump system; and
pumping oil from the compartment sump by a second pump of the pump system.

19. The method of claim 18, wherein the pump system is housed within the bearing compartment.

20. The method of claim 15, further comprising filtering the oil from at least one of the auxiliary reservoir or the compartment sump prior to delivering the oil to the manifold.

* * * * *